US010671972B2

(12) United States Patent
DeLuca et al.

(10) Patent No.: US 10,671,972 B2
(45) Date of Patent: *Jun. 2, 2020

(54) AUTOMATED ZONE LOCATION CHARACTERIZATION

(71) Applicant: INTERNATIONAL BUSINESS MACHINES CORPORATION, Armonk, NY (US)

(72) Inventors: Lisa Seacat DeLuca, Baltimore, MD (US); Jeremy A. Greenberger, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/285,467

(22) Filed: Feb. 26, 2019

(65) Prior Publication Data

US 2019/0197467 A1 Jun. 27, 2019

Related U.S. Application Data

(63) Continuation of application No. 15/158,649, filed on May 19, 2016, now Pat. No. 10,311,398.

(51) Int. Cl.
*G06Q 10/08* (2012.01)
*H04W 4/02* (2018.01)
*H04W 4/80* (2018.01)

(52) U.S. Cl.
CPC .......... *G06Q 10/087* (2013.01); *H04W 4/023* (2013.01); *H04W 4/80* (2018.02)

(58) Field of Classification Search
CPC ........ G06Q 10/00; G06Q 10/08; G06Q 30/00; G06Q 20/34; G06K 19/06

USPC ........ 705/28, 14.53, 26.9, 41; 700/216, 214; 235/385

See application file for complete search history.

(56) References Cited

U.S. PATENT DOCUMENTS

| | | | |
|---|---|---|---|
| 2008/0120200 A1* | 5/2008 | Hurtis | G06Q 10/087 705/28 |
| 2009/0012704 A1 | 1/2009 | Franco | |
| 2012/0259732 A1* | 10/2012 | Sasankan | G01S 5/0205 705/26.9 |

(Continued)

OTHER PUBLICATIONS

Finnie, Richard; LinkedIn; Aug. 7, 2014; https://www.linkedin.com/pulse/20140807162720-258558574-time-is-money-the-impact-of-customer-dwell-time-on-retail-sales; 13 pages.

(Continued)

*Primary Examiner* — Olusegun Goyea
(74) *Attorney, Agent, or Firm* — Schmeiser, Olsen & Watts; Reza Sarbakhsh

(57) ABSTRACT

A method and system for automatically characterizing retail zones is provided. The method includes determining, via a mobile device of a user, that a user has entered a first zone of a plurality of zones internal to a first entity structure. Product information is scanned via the mobile device in response to the user locating a first product. The product information describes the first product. Historical product and zone related data is analyzed with respect to the first zone and the product information and it is determined, based on the analysis, if the first product is currently associated with being located within the first zone.

20 Claims, 4 Drawing Sheets

(56) References Cited

U.S. PATENT DOCUMENTS

| | | | |
|---|---|---|---|
| 2013/0233922 A1* | 9/2013 | Schoening | G06Q 10/087 235/385 |
| 2013/0332273 A1* | 12/2013 | Gu | G06Q 30/0205 705/14.53 |
| 2014/0279474 A1* | 9/2014 | Evans | G06Q 20/3572 705/41 |
| 2015/0262118 A1* | 9/2015 | Grissom | G06Q 10/087 700/216 |
| 2015/0278829 A1 | 10/2015 | Lu | |
| 2016/0239733 A1* | 8/2016 | Hertz | G06F 16/29 |
| 2017/0337503 A1 | 11/2017 | Deluca | |

OTHER PUBLICATIONS

Van Grove, Jennifer; iPhone App Provides Turn-By-Turn Directions Inside Stores & Stadiums; Mashable; Mar. 22, 2011; Hhttp://mashable.com/2011/03/22/meridian/#KU2AHY_6dEq5; 3 pages.
Friedman, Mark J.; List of IBM Patents or Patent Applications Treated as Related; Feb. 26, 2019; 1 page.

* cited by examiner

AUTOMATED ZONE LOCATION CHARACTERIZATION

CROSS REFERENCE TO RELATED APPLICATIONS

This application is a continuation application claiming priority to Ser. No. 15/158,649 filed May 19, 2016, now U.S. Pat No. 10,311,398, issued Jun. 4, 2019, the contents of which are hereby incorporated by reference.

FIELD

The present invention relates generally to a method for determining a product location and in particular to a method and associated system for improving an industrial technology by associating product locations with specified zones within a structure.

BACKGROUND

Determining product locations typically includes an inaccurate process with little flexibility. Associating locations with broad areas typically involves an unreliable process. Locating various products may include a complicated process that may be time consuming and require a large amount of resources. Accordingly, there exists a need in the art to overcome at least some of the deficiencies and limitations described herein above.

SUMMARY

A first aspect of the invention provides an automated zone characterization method comprising: first determining, by a processor of a computing device via a mobile device of a user, that a user has entered a first zone of a plurality of zones internal to a first entity structure; scanning, by the processor via the mobile device in response to the user locating a first product, product information from the first product, wherein the product information describes the first product; analyzing, by the processor, historical product and zone related data with respect to the first zone and the product information; and second determining, by the processor based on results of the analyzing, if the first product is currently associated with being located within the first zone.

A second aspect of the invention provides a computer program product, comprising a computer readable hardware storage device storing a computer readable program code, the computer readable program code comprising an algorithm that when executed by a processor of a computing device implements an automated zone characterization method, the method comprising: first determining, by the processor via a mobile device of a user, that a user has entered a first zone of a plurality of zones internal to a first entity structure; scanning, by the processor via the mobile device in response to the user locating a first product, product information from the first product, wherein the product information describes the first product; analyzing, by the processor, historical product and zone related data with respect to the first zone and the product information; and second determining, by the processor based on results of the analyzing, if the first product is currently associated with being located within the first zone.

A third aspect of the invention provides a computer device comprising a processor coupled to a computer-readable memory unit, the memory unit comprising instructions that when executed by the processor executes an automated zone characterization method, the method comprising: first determining, by the processor via a mobile device of a user, that a user has entered a first zone of a plurality of zones internal to a first entity structure; scanning, by the processor via the mobile device in response to the user locating a first product, product information from the first product, wherein the product information describes the first product; analyzing, by the processor, historical product and zone related data with respect to the first zone and the product information; and second determining, by the processor based on results of the analyzing, if the first product is currently associated with being located within the first zone.

The present invention advantageously provides a simple method and associated system capable of determining product locations.

DETAILED DESCRIPTION

Figure 1:
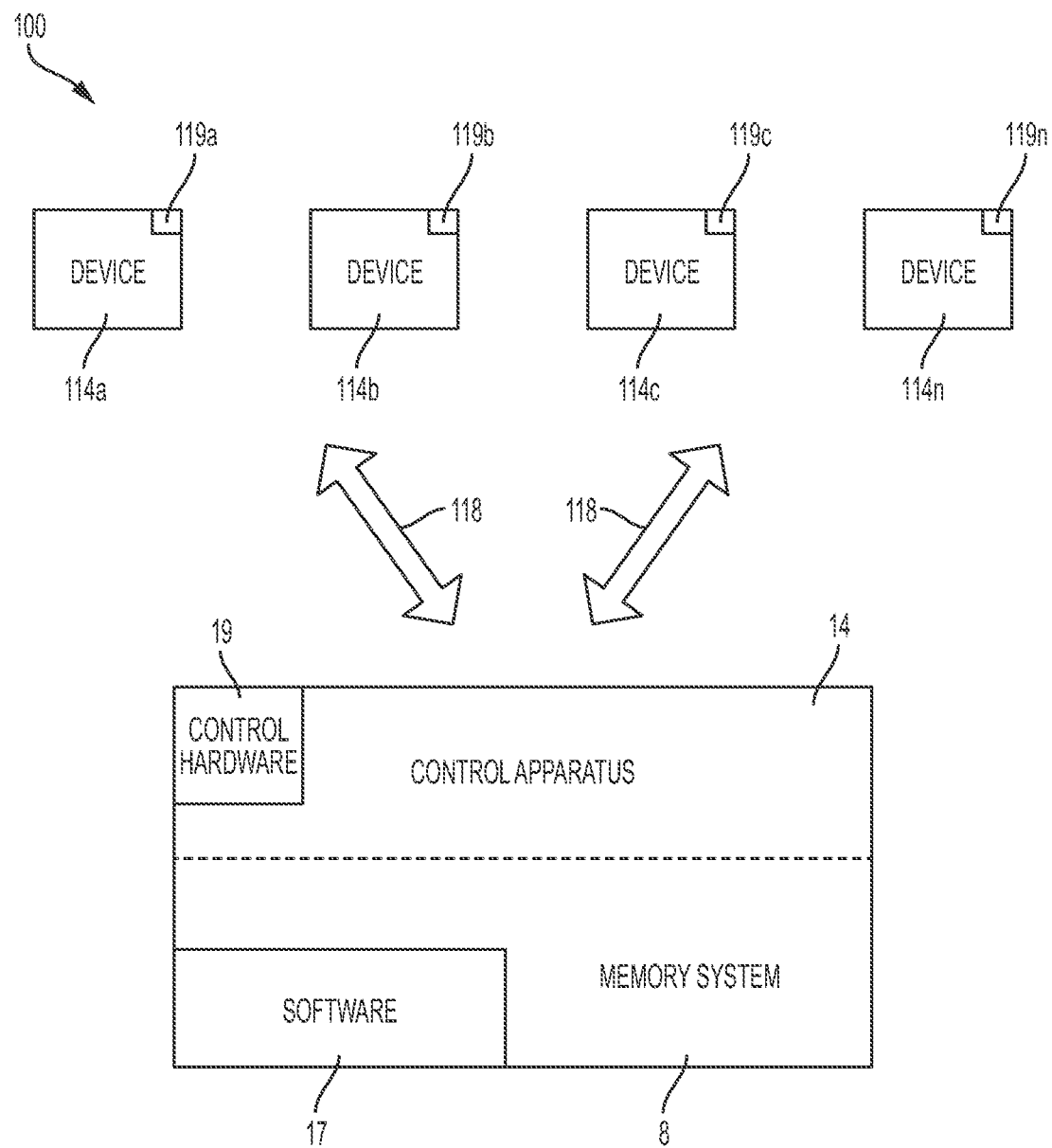
FIG. 1 illustrates a system for associating product locations with specified zones within a structure, in accordance with embodiments of the present invention.

FIG. 1 illustrates a system 100 for associating product locations with specified zones within a structure, in accordance with embodiments of the present invention. System 100 enables an improvement to a process for determining a location of a product within a structure (e.g., a store). The process may include reading a barcode, QR code, or RFID code attached to a product via a device (e.g., of devices 114a . . . 114n) of a user. A location of the user device may be determined using GPS, cell phone tower triangulation, barcodes, RFID tags, etc. A resulting barcode, QR code, RFID code, etc. may be stored in a product location database and in response to a product location query, an associated location zone may be determined.

System 100 of FIG. 1 includes a control apparatus 14 in communication with devices 114a . . . 114n via a wireless network 118. Devices 114a . . . 114n may comprise any type of mobile hardware communication device including, inter alia, a mobile phone, a PDA, a barcode scanner, a specialized hardware device, etc. Devices 114a . . . 114n (i.e., control hardware 119a . . . 119n internal to devices 114a . . . 114n and control apparatus 14 each may comprise an embedded computer. An embedded computer is defined herein as a remotely portable dedicated computer comprising a combination of computer hardware and software (fixed in capability or programmable) specifically designed for executing a specialized function. Programmable embedded computers may comprise specialized programming interfaces. Additionally, devices 114a . . . 114n (i.e., control hardware 119a . . . 119n internal to devices 114a . . . 114n) and control apparatus 14 may each comprise a specialized hardware device comprising specialized (non-generic) hardware and circuitry (i.e., specialized discrete non-generic analog, digital, and logic based circuitry) for executing a process described with respect to FIGS. 1-3. The specialized discrete non-generic analog, digital, and logic based circuitry may include proprietary specially designed components (e.g., a specialized integrated circuit designed for only implementing an automated process for associating product locations with specified zones within a structure). Control apparatus 14 includes a memory system 8, software 17, and control hardware 19 (all sensors and associated control hardware for enabling software 17 to execute a process for coordinating and controlling devices 114a . . . 114n for supplying items 117a . . . 117n). Control hardware 119a . . . 119n may include sensors. Sensors may include, inter alia, GPS sensors, video recording devices, optical sensors, weight sensors, RFID sensors, barcode sensors, Bluetooth sensors, NFC sensors, etc. The memory system 8 may include a single memory system. Alternatively, the memory system may include a plurality of memory systems.

System 100 determines a specific location of a mobile device (e.g., via Bluetooth, Wi-Fi, GPS, etc.) and associates the specific location of the mobile device with an identifying event that is correlated with a pre-defined zone via the following implementation process:

A store associate or individual uses a mobile device that is tracked via in-venue location sensor technologies. The mobile device is enabled to determine a current zone (within a structure such as a store) associated with a current location of the store associate or individual. The store associate or individual proceeds to a product of interest and scans the product for identifying information. The product may be scanned via barcode scanning technologies, RFID tags, Bluetooth sensors, NFC sensors, etc. In response to the aforementioned process, the product is determined to be located within a same zone as the store associate or individual and therefore the product is associated with the zone for future reference.

Figure 2:
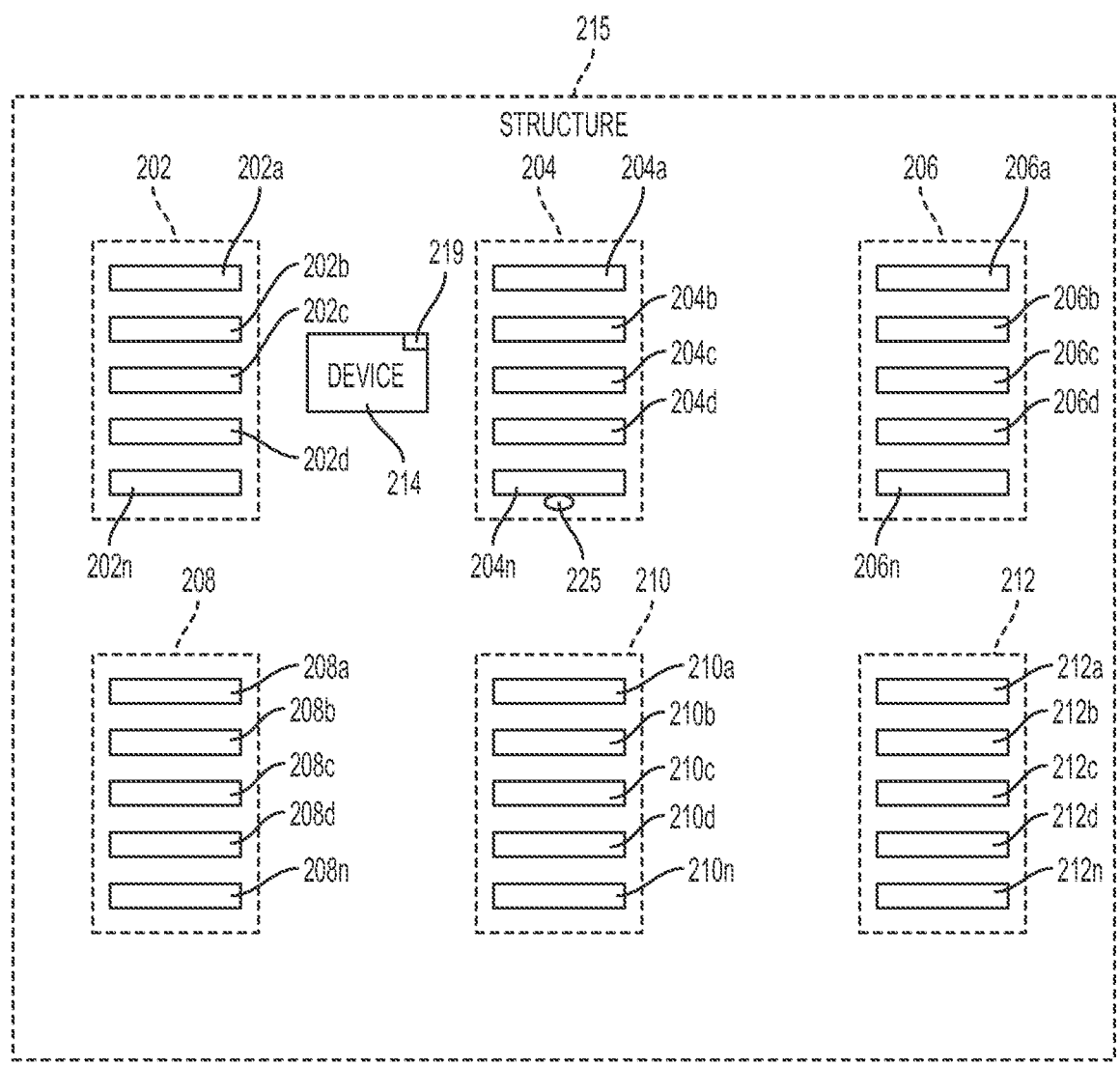
FIG. 2 illustrates a structure comprising predetermined zones each comprising associated rows comprising products for sale, in accordance with embodiments of the present invention.

FIG. 2 illustrates a structure 215 (e.g., a retail store) comprising a plurality of (predetermined) zones 202, 204, 206, 208, 210, and 212 each comprising associated rows 202a . . . 202n, 204a . . . 204n, 206a . . . 206n, 208a . . . 208n, 210a . . . 210n, and 212a . . . 212n comprising products (e.g., product 225) for sale, in accordance with embodiments of the present invention. Product locations are associated with zones 202, 204, 206, 208, 210, and 212 via a scanning process executed by device 214 (i.e., control hardware 219) via the aforementioned process.

The following implementation example describes a process for associating product locations with a zone:

The process is initiated when Mary (i.e., a frequent shopper at a retail establishment (herein referred to as store A) at structure 215) enters store A and requests (via a device such as device 214) a specific video game for purchase. In response, a broad area in store A is presented to Mary and Mary proceeds to the broad area. The broad area comprises the video game but Mary must search to locate the video game. Eventually, Mary locates the video game and scans (via device 214) a barcode on the video enabling a price comparison with an online retailer. In response, Mary decides to purchase the video game from store A. Additionally, results of the barcode scanning process (performed by Mary) are used to identify the video game and associated zone comprising the video game. Information describing the video game and determined zone is stored within a product management database for future reference. At a later time/date, an individual proceeds to store A to purchase the same video game purchased by Mary. The individual requests (via a device) the video game for purchase. In response, the zone comprising the video game (i.e., determined during the aforementioned process executed by Mary) is presented to the individual. Additionally, an associated row (comprising the video game) within the zone may be presented to the individual.

Alternatively, an employee of store A may use a hardware device to scan products thereby generating an identifying event (e.g., via scanning a barcode or RFID tag) to determine specified zones associated with various products.

Figure 3:
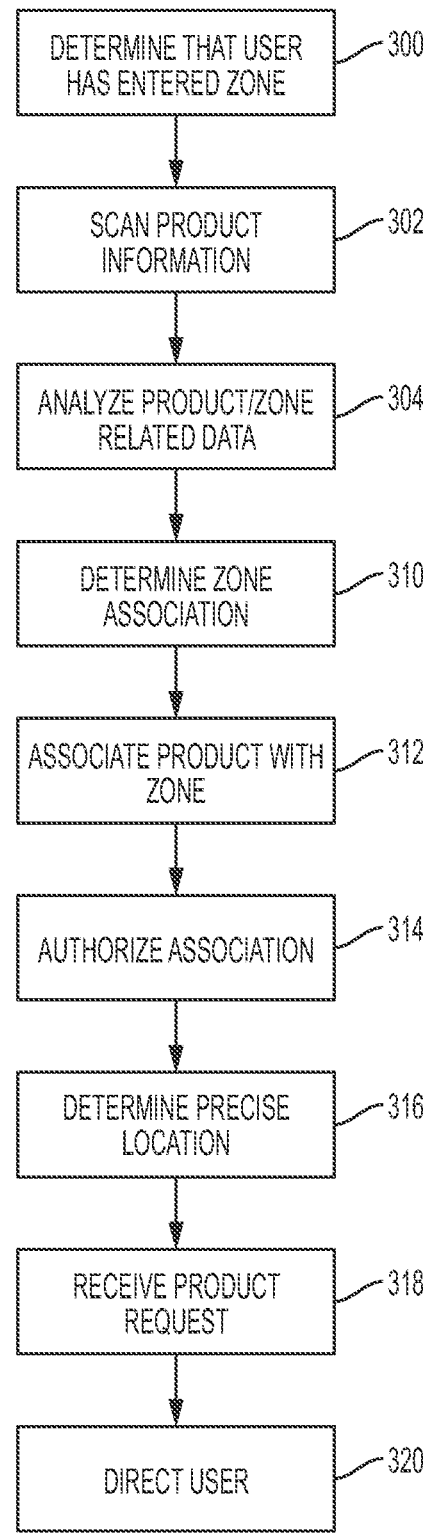
FIG. 3 illustrates an algorithm detailing a process flow enabled by the system of FIG. 1 for associating product locations with specified zones within a structure, in accordance with embodiments of the present invention.

FIG. 3 illustrates an algorithm detailing a process flow enabled by system 100 of FIG. 1 for associating product locations with specified zones within a structure, in accordance with embodiments of the present invention. Each of the steps in the algorithm of FIG. 3 may be enabled and executed in any order by a computer processor(s) or any type of specialize d hardware executing computer code. In step 300, it is determined (via a mobile device of a user) that the user has entered a zone of a plurality of zones internal to a first entity structure. In step 302, product information is scanned from a product via the mobile device in response to the user locating the product. The product information describes the product. The scanning process may include a barcode scanning process, an RFID scanning process, a Bluetooth scanning process, an image recognition process, an NFC scanning process, etc. Additionally, the zone may be tagged with an ID associated with a product name for the product, a product category for the product, a product description for the product, a product brand for the product, etc. In step 304, historical product and zone related data is analyzed with respect to the zone and the product information. In step 310, it is determined if the product is currently associated with being located within the zone based on results of the analysis. If the product is not determined to be currently associated with being located within the zone then in step 312, the product is associated with being located within the zone. In optional step 314, the association between the product and the zone (from step 312) is verified and authorized. The authorization may be executed by an administrator. Alternatively, the authorization may be executed in response to a specified number of scans of the product. In step optional 316, a precise location of the user and the product occurring during the canning of step 302 is determined. The precise location may be determined by: determining coordinates of the mobile device of the user, executing a triangulation process with respect to the mobile device, etc. In optional step 318, a product request is received and in optional step 320, user is directed to a determined zone associated with a product of the product request.

Figure 4:
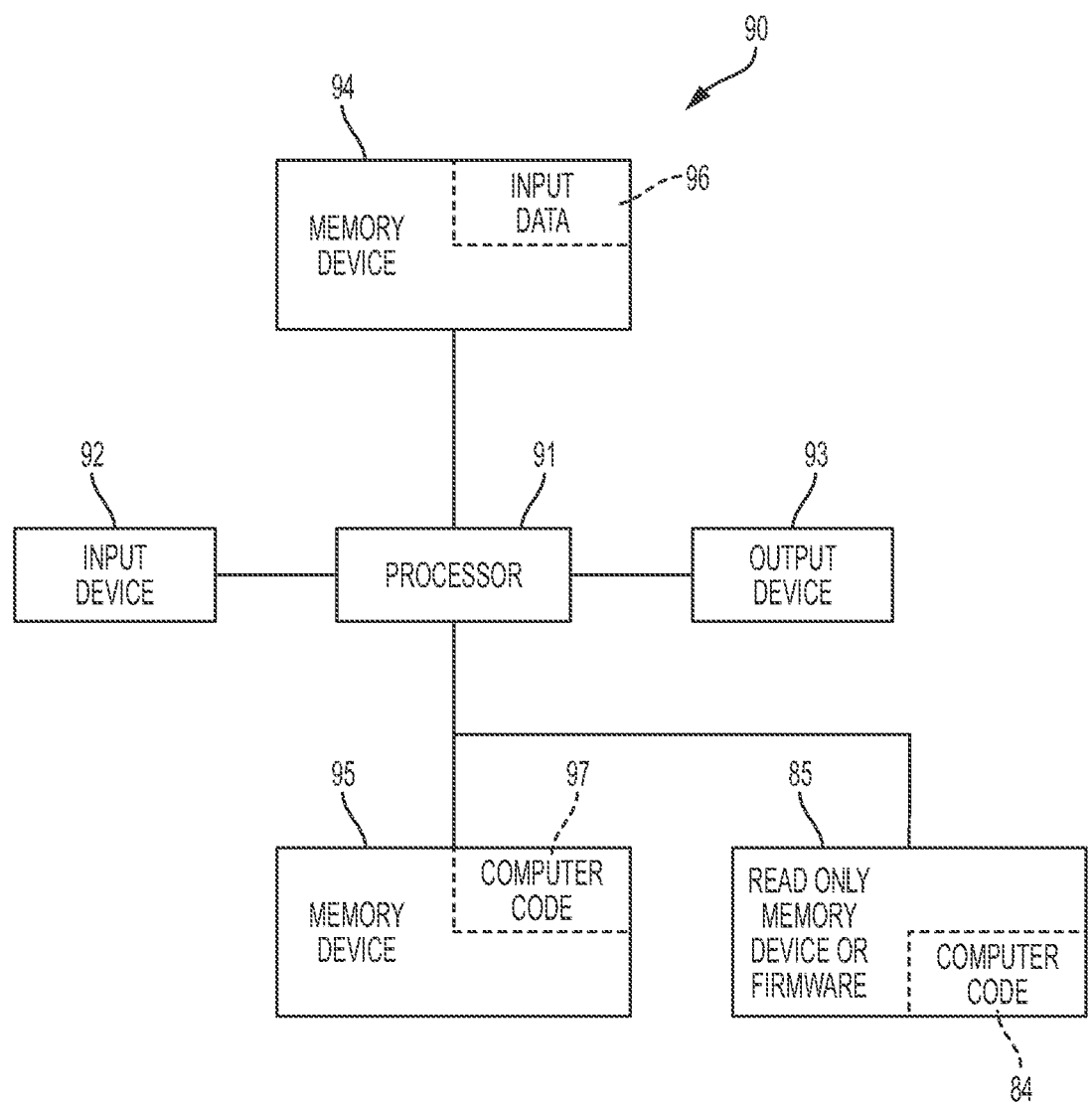
FIG. 4 illustrates a computer system used by the system of FIG. 1 for enabling a process for associating product locations with specified zones within a structure, in accordance with embodiments of the present invention.

FIG. 4 illustrates a computer system 90 (e.g., control hardware 119a . . . 119n internal to devices 114a . . . 114n and control apparatus 14) used by or comprised by the systems of FIG. 1 and FIG. 2 for enabling a process for associating product locations with specified zones within a structure, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 4 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 3) for enabling a process for associating product locations with specified zones within a structure. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms (e.g., the algorithm of FIG. 3) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithm of FIG. 3) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to enable a process for associating product locations with specified zones within a structure. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for enabling a process for associating product locations with specified zones within a structure. In another embodiment, the invention provides a business method that performs the process steps of the invention on a subscription, advertising, and/or fee basis. That is, a service supplier, such as a Solution Integrator, could offer to enable a process for associating product locations with specified zones within a structure. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An automated zone detection and characterization technology improvement method comprising:
    first determining, by a processor of a special purpose hardware based computing device via a mobile device of a user, that a user has entered a first zone of a plurality of zones internal to a first entity structure, wherein said special purpose hardware based computing device comprises electronic circuitry comprising a programmable logic array utilizing state information of specialized firmware program code configured to execute specialized software for personalizing said electronic circuitry for performing said automated zone detection and characterization technology improvement method;
    tracking, by said processor via location sensors executing a mobile device triangulation detection process, said mobile device of said user;
    receiving, by said processor from said mobile device of said user executing an RFID detection process via hardware sensors of said mobile device in response to detecting via said tracking that said user is locating a first product, product information from said first product, wherein said product information describes said first product;
    second determining, by said processor based on results of analyzing historical product and zone related data with respect to said first zone and said product information, if said first product is currently associated with being located within said first zone, wherein results of said second determining indicate that said first product is not currently associated with being located within said first zone;
    associating, by said processor, said first product with being located within said first zone;
    determining, by said processor via said mobile device, a precise location of said user and said first product occurring during said receiving said product information, wherein said precise location is within said first zone;
    receiving, by said processor via an additional mobile device of an additional user, a request for said first product at said first entity structure; and
    directing, by said processor via said additional mobile device, said additional user to said precise location such that said additional user proceeds to said precise location and retrieves said first product thereby improving a product location detection and retrieval process.

2. The method of claim 1, wherein said first zone is tagged with an ID selected from the group consisting of a product name for said first product, a product category for said first product, a product description for said first product, and a product brand for said first product.

3. The method of claim 1, further comprising:
    authorizing by said processor in response to a command from an administrator, said associating.

4. The method of claim 1, further comprising:
    authorizing by said processor in response to executing a specified number of scans, said associating.

5. The method of claim 1, wherein said determining said precise location comprises determining coordinates of said mobile device of said user.

6. The method of claim 1, wherein said determining said precise location comprises executing a triangulation process with respect to said mobile device.

7. The method of claim 1, wherein said receiving said product information occurs via a process selected from the group consisting of a barcode scanning process, an RFID scanning process, a Bluetooth scanning process, an image recognition process, and an NFC scanning process.

8. The method of claim 1, further comprising:
receiving, by said processor via an identification mobile device of an identifying user in response to an identifying user locating multiple products, product data from each product of said multiple products, wherein each said product data describes a differing product of said multiple products;
identifying, by said processor based on said each said product data, each said differing product;
determining, by said processor via said identification mobile device, precise locations of said identifying user and each said differing product occurring during each said scanning of each said product data; and
storing within a database, by said processor, data indicating each location of said precise locations.

9. The method of claim 1, wherein said first determining that said user has entered said first zone comprises determining a Bluetooth transmission area.

10. The method of claim 1, wherein results of said second determining indicate that said first product is currently associated with being located within said first zone, and wherein said method further comprises:
receiving, by said processor, offers associated with said first product.

11. The method of claim 1, further comprising:
providing at least one support service for at least one of creating, integrating, hosting, maintaining, and deploying computer-readable code in the control hardware, said code being executed by the computer processor to implement: said first determining, said scanning, and said second determining.

12. A computer program product, comprising a computer readable hardware storage device storing a computer readable program code, said computer readable program code comprising an algorithm that when executed by a processor of a special purpose hardware based computing device implements an automated zone detection and characterization technology improvement method, said method comprising:
first determining, by said processor via a mobile device of a user, that a user has entered a first zone of a plurality of zones internal to a first entity structure, wherein said special purpose hardware based computing device comprises electronic circuitry comprising a programmable logic array utilizing state information of specialized firmware program code configured to execute specialized software for personalizing said electronic circuitry for performing said automated zone detection and characterization improvement method;
tracking, by said processor via location sensors executing a mobile device triangulation detection process, said mobile device of said user;
receiving, by said processor from said mobile device of said user executing an RFID detection process via hardware sensors of said mobile device in response to detecting via said tracking that said user is locating a first product, product information from said first product, wherein said product information describes said first product;
second determining, by said processor based on results of analyzing historical product and zone related data with respect to said first zone and said product information, if said first product is currently associated with being located within said first zone, wherein results of said second determining indicate that said first product is not currently associated with being located within said first zone;
associating, by said processor, said first product with being located within said first zone;
determining, by said processor via said mobile device, a precise location of said user and said first product occurring during said receiving said product information, wherein said precise location is within said first zone;
receiving, by said processor via an additional mobile device of an additional user, a request for said first product at said first entity structure; and
directing, by said processor via said additional mobile device, said additional user to said precise location such that said additional user proceeds to said precise location and retrieves said first product thereby improving a product location detection and retrieval process.

13. The computer program product of claim 12, wherein said first zone is tagged with an ID selected from the group consisting of a product name for said first product, a product category for said first product, a product description for said first product, and a product brand for said first product.

14. The computer program product of claim 12, wherein said method further comprises:
authorizing by said processor in response to a command from an administrator, said associating.

15. The computer program product of claim 12, wherein said method further comprises:
authorizing by said processor in response to executing a specified number of scans, said associating.

16. A special purpose hardware based computer device comprising a processor coupled to a computer-readable memory unit, said memory unit comprising instructions that when executed by the processor executes an automated zone detection and characterization technology improvement method, said method comprising:
first determining, by said processor via a mobile device of a user, that a user has entered a first zone of a plurality of zones internal to a first entity structure, wherein said special purpose hardware based computing device comprises electronic circuitry comprising a programmable logic array utilizing state information of specialized firmware program code configured to execute specialized software for personalizing said electronic circuitry for performing said automated zone detection and characterization improvement method;
tracking, by said processor via location sensors executing a mobile device triangulation detection process, said mobile device of said user;
receiving, by said processor from said mobile device of said user executing an RFID detection process via hardware sensors of said mobile device in response to detecting via said tracking that said user is locating a first product, product information from said first product, wherein said product information describes said first product;
second determining, by said processor based on results of analyzing historical product and zone related data with respect to said first zone and said product information, if said first product is currently associated with being located within said first zone, wherein results of said second determining indicate that said first product is not currently associated with being located within said first zone;

associating, by said processor, said first product with being located within said first zone;

determining, by said processor via said mobile device, a precise location of said user and said first product occurring during said receiving said product information, wherein said precise location is within said first zone;

receiving, by said processor via an additional mobile device of an additional user, a request for said first product at said first entity structure; and directing, by said processor via said additional mobile device, said additional user to said precise location such that said additional user proceeds to said precise location and retrieves said first product thereby improving a product location detection and retrieval process.

17. The special purpose hardware based computer device of claim 16, wherein said first zone is tagged with an ID selected from the group consisting of a product name for said first product, a product category for said first product, a product description for said first product, and a product brand for said first product.

18. The special purpose hardware based computer device of claim 16, wherein said method further comprises:

authorizing by said processor in response to a command from an administrator, said associating.

19. The special purpose hardware based computer device of claim 16, wherein said method further comprises:

authorizing by said processor in response to executing a specified number of scans, said associating.

20. The special purpose hardware based computer device of claim 16, wherein said determining said precise location comprises determining coordinates of said mobile device of said user.

* * * * *